(12) United States Patent
Hua et al.

(10) Patent No.: US 12,407,232 B2
(45) Date of Patent: Sep. 2, 2025

(54) VIBRATION MOTOR

(71) Applicant: AAC Microtech (Changzhou) Co., Ltd., Changzhou (CN)

(72) Inventors: Zixu Hua, Shenzhen (CN); Junsheng Wang, Shenzhen (CN); Qiang Zhang, Shenzhen (CN); Yanxue Zhi, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 323 days.

(21) Appl. No.: 18/090,532

(22) Filed: Dec. 29, 2022

(65) Prior Publication Data

US 2024/0088767 A1 Mar. 14, 2024

Related U.S. Application Data

(63) Continuation of application No. PCT/CN2022/121785, filed on Sep. 27, 2022.

(30) Foreign Application Priority Data

Sep. 9, 2022 (CN) .......................... 202222409094.0

(51) Int. Cl.
*H02K 33/02* (2006.01)
*H02K 1/34* (2006.01)

(52) U.S. Cl.
CPC .............. *H02K 33/02* (2013.01); *H02K 1/34* (2013.01); *H02K 2203/03* (2013.01)

(58) Field of Classification Search
CPC ........ H02K 33/02; H02K 33/04; H02K 33/08; H02K 33/10; H02K 35/04; H02K 1/34; H02K 2203/03

USPC .......................................................... 310/81
See application file for complete search history.

(56) References Cited

U.S. PATENT DOCUMENTS

| | | | |
|---|---|---|---|
| 2003/0034705 A1* | 2/2003 | Hakansson | H04R 9/066 310/81 |
| 2022/0085709 A1* | 3/2022 | Oonishi | B06B 1/045 |
| 2023/0101894 A1* | 3/2023 | Takahashi | H02K 33/02 310/81 |

FOREIGN PATENT DOCUMENTS

| | | | | |
|---|---|---|---|---|
| CN | 106411092 A | * | 2/2017 | ............ H02K 33/02 |
| CN | 212850214 U | * | 3/2021 | |

OTHER PUBLICATIONS

Machine translation of CN-212850214-U. (Year: 2021).*
Machine translation of CN-106411092-A. (Year: 2017).*

* cited by examiner

*Primary Examiner* — Michael Andrews
(74) *Attorney, Agent, or Firm* — Wiersch Law Group

(57) ABSTRACT

The present application provides a vibration motor, including a casing with an accommodating space, a vibrator assembly, a stator assembly, and elastic members accommodated in the accommodating space. The stator assembly is fixed to the casing, and the vibrator assembly is movably connected to the casing through elastic members. The vibrator assembly includes a support assembly having two ends fixedly connected to corresponding elastic members, and the stator assembly is fixed to the casing. The support assembly includes a skeleton and an adhesive layer at least partially covered on an outer side of the skeleton. The vibrator assembly further includes a coil nested outside the adhesive layer, and the stator assembly is configured to provide a driving force for the vibrator assembly to move along a vibration direction.

12 Claims, 14 Drawing Sheets

VIBRATION MOTOR

TECHNICAL FIELD

The present application relates to the technical field of electromagnetic motion, in particular to a vibration motor.

BACKGROUND

With the development of electronic technologies, portable consumer electronics are increasingly being favored by people, such as mobile phones, handheld game machines, navigation devices, and handheld multimedia entertainment devices. A vibration motor is generally used for system feedback, such as an incoming call prompt, an information prompt, and a navigation prompt of a mobile phone, and the vibration feedback of a game machine.

In a vibration motor in the related art, a coil support is generally fixed to a casing, a coil is wound on the coil support, and a vibrator assembly is arranged in the coil support such that the coil can drive the vibrator assembly to vibrate. However, in order to accommodate the vibrator assembly, the coil support is usually arranged hollow, and the coil support is easy to deform while being wound, so that an outline of the coil is difficult to control. Furthermore, an upper layer and a lower layer of the coil are wound on the coil support, which is not conducive to improving the winding speed of the coil.

Therefore, it is necessary to provide a new vibration motor.

SUMMARY

An object of the present application is to provide a vibration motor, which can at least solve the drawbacks in the prior art to a certain extent.

The technical solutions of the present application are as follows.

The present application provides a vibration motor, comprising:
  a casing with an accommodating space;
  elastic members;
  a vibrator assembly movably connected to the casing via the elastic member, comprising:
    a support assembly, two ends of the support assembly being fixedly connected to a corresponding elastic member, comprising:
      a skeleton; and
      an adhesive layer at least partially covered on an outer side of the skeleton; and
    a coil nested outside the adhesive layer; and
  a stator assembly fixed to the casing and configured to provide a driving force for the vibrator assembly to move along a vibration direction;
  wherein the vibrator assembly, the stator assembly, and the elastic member are accommodated in the accommodating space.

In an embodiment, the skeleton comprises a main body and two supporting portions fixed at two ends of the main body; wherein the supporting portions are protruded from a surface of a peripheral side of the main body; the adhesive layer is covered on a peripheral side of the main body, and the coil is arranged between the two supporting portions.

In an embodiment, the adhesive layer is further covered on an outer side of each of the supporting portions; the adhesive layer is extended along the vibration direction to form fixing portions, and each fixing portion is fixedly connected to each elastic member.

In an embodiment, each of the fixing portions is provided with a first mounting hole, and the vibration motor further comprises a first rivet arranged through each of the elastic members and fixed to each of the first mounting holes; and/or,
  each of the fixing portions is provided with a first threaded hole, and the vibration motor further comprises a first screw arranged through each of the elastic members and connected to each of the first threaded holes; and/or,
  each of the elastic members is provided with a positioning hole, and the vibration motor further comprises connecting protrusions, wherein one end of each of the connecting protrusion is fixed to the fixing portion, and the other end of each of the connecting protrusion arranged through the positioning hole; the connecting protrusions are fixedly connected to the elastic members by means of heating points.

In an embodiment, the skeleton further comprises connecting portions extended from an end of the main body along the vibration direction and protruded from the supporting portions; the connecting portions are fixedly connected to the elastic members, and the adhesive layer is further covered on a peripheral side of each of the connecting portion and an outer side of each of the supporting portions.

In an embodiment, each of the connecting portions is provided with a second mounting hole, and the vibration motor further comprises a second rivet arranged through each of the elastic members and fixed to each of the second mounting holes; and/or,
  each of the connecting portions is provided with a second threaded hole, and the vibration motor further comprises a second screw arranged through each of the elastic members and connected to the each of the second threaded holes; and/or,
  the vibrating motor further includes a first welding spot arranged on a side of each of the elastic members away from the connecting portions, and the connecting portions are fixedly welded to the elastic member at the first welding spot.

In an embodiment, the skeleton further comprises vertical posts, wherein one end of each of the vertical posts is fixed to each of the supporting portions, and the other end of each of the vertical posts is fixed to each of the elastic members; and the adhesive layer is further covered on peripheral sides of the vertical posts and outer side of the supporting portions.

In an embodiment, each of the vertical posts is provided with a third mounting hole, and the vibration motor further comprises a third rivet arranged through each of the elastic members and fixed to each of the third mounting hole; and/or,
  each of the vertical posts is provided with a third threaded hole, and the vibration motor further comprises a third screw arranged through each of the elastic members and connected to each of the third threaded holes; and/or,
  the vibrating motor further comprises a second welding spot arranged on a side of each of the elastic members away from the vertical posts, and the vertical posts are fixedly welded to the elastic member at the second welding spot.

In an embodiment, the vertical posts are fixed to the supporting portions by welding or adhering; each of the supporting portions is provided with a positioning groove; each of the vertical posts is provided with a positioning portion, and the positioning portions are embedded and fixed in the positioning grooves.

In an embodiment, the casing comprises: an outer casing with a through-cavity and two cover plates assembled on two ends of the outer casing to form the accommodating space; wherein the elastic members are fixed with the casing by means of heating, and two ends of each of the elastic members are abutted against the outer casing and each of the cover plates, respectively.

In an embodiment, the adhesive layer is extended towards an inner wall of the casing to form a contact portion; the vibration motor further comprises a flexible printed circuit, wherein one end of the flexible printed circuit is fixed to a side wall of the shell, and the other end of the flexible printed circuit is fixed to the contact portion; and the flexible printed circuit is electrically connected to the coil;

the vibrator assembly further comprises two mass blocks nested and fixed on an outer side of the adhesive layer and spaced apart from the coil, and a gap is provided between each of the mass blocks and an inner wall of the casing;

the stator assembly comprises a polar core fixed to the casing and a magnetic steel fixed at one side of the polar core close to the support assembly; the magnetic steel is located between the two mass blocks, and the magnetic steel is configured to provide a magnetic field.

The beneficial effects of the present application are as follows. After the coil is energized, magnetic induction lines may be cut in a magnetic field generated by the stator assembly to generate an induced electromotive force, so that the support assembly generates vertical reciprocating vibrations, thereby realizing the vibration of a vibrator assembly and providing a motor vibration sensing. Since the coil is nested on the support assembly, and the support assembly has an adhesive layer structure covered on the skeleton, the coil is not easy to deform when winding, thus having a good consistency of an outer shape of the coil. Besides, the winding does not need to be performed on two layers, i. e. upper and lower layers, which is beneficial for improving the winding speed. Moreover, the coil is nested and fixed outside the adhesive layer, and the coil is not contacted with the metal, thereby achieving an excellent insulation performance and reducing the risk of short circuits.

DETAILED DESCRIPTION OF THE EMBODIMENTS

Figure 1:
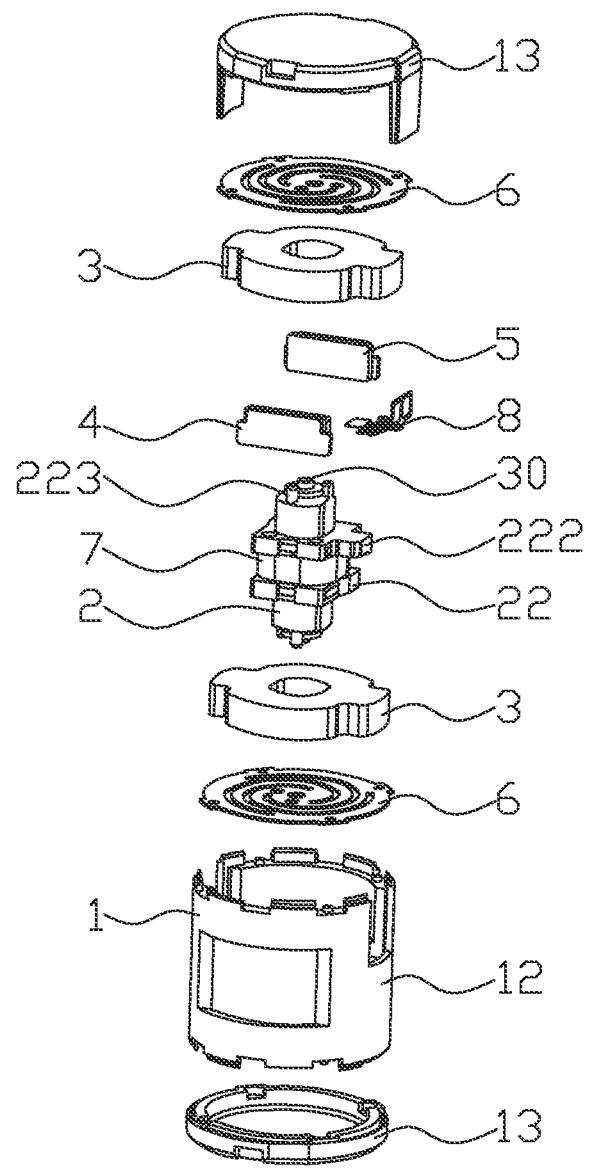
FIG. 1 is an exploded view of a vibration motor according to an embodiment of the present application.
Figure 2:
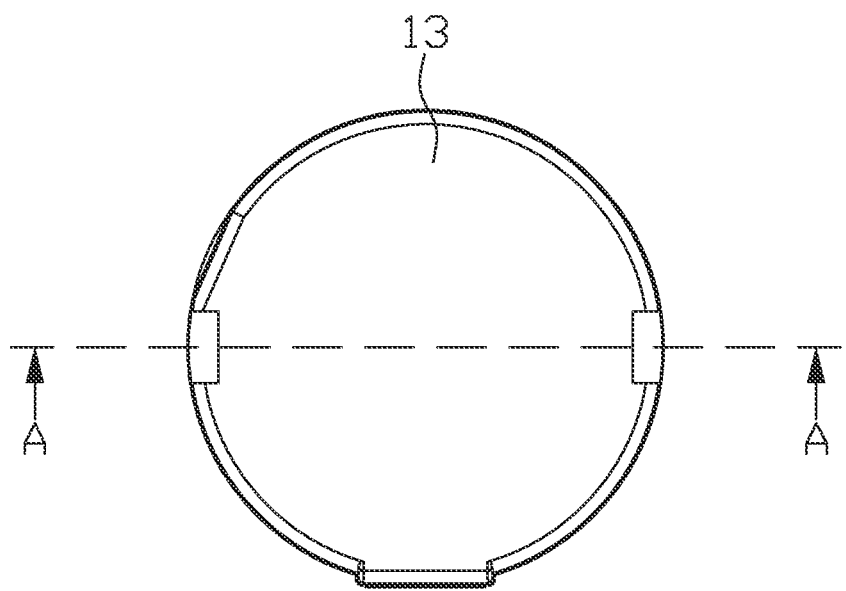
FIG. 2 is a top view of the vibration motor according to an embodiment of the present application.

The present application will be further described below in conjunction with the accompanying drawings and embodiments.

Referring to FIGS. 1 to 14, an embodiment of the present application provides a vibration motor, including a casing 1 with an accommodating space 11, a vibrator assembly, a stator assembly and elastic members 6 accommodated in the accommodating space 11. The stator assembly is fixed to the casing 1. The vibrator assembly is movably connected to the casing 1 through the elastic members 6. The vibrator assembly includes a support assembly 2, two ends of which are fixedly connected to a corresponding elastic member 6. The support assembly 2 includes a skeleton 21 and an adhesive layer 22 at least partially covered on an outer side of the skeleton 21. The vibrator assembly further includes a coil 7 nested and fixed outside the adhesive layer 22. The stator assembly is configured to provide a driving force for the vibrator assembly to move along a vibration direction. It should be understood that after the coil 7 is energized, magnetic induction lines may be cut in a magnetic field generated by the stator assembly to generate an induced electromotive force, so that the support assembly 2 generates vertical reciprocating vibrations, thereby realizing the vibration of a vibrator assembly and providing a motor vibration sensing. Since the coil 7 is nested on the support assembly 2, and the support assembly 2 has an adhesive layer structure covered on a skeleton 21, the coil is not easy to deform while winding, the consistency of the outer shape of the coil 7 is relatively good. Besides, the winding does not need to be performed on two layers, i. e. upper and lower layers, which is beneficial for improving the winding speed. Moreover, the coil 7 is nested and fixed outside the adhesive layer 22, and the coil 7 is not contacted with the metal, thereby achieving an excellent insulation performance and reducing the risk of short circuits.

Referring to FIGS. 1 to 14, further, the skeleton 21 includes a main body 211 and two supporting portions 212 fixed at two ends of the main body 211. The supporting portions 212 are protruded from a surface of a peripheral side of the main body 211, and the adhesive layer 22 is covered on the peripheral side of the main body 211. The coil 7 is arranged between the two supporting portions 212. Specifically, the main body 211 may be a cylinder, and the main body 211 and the two supporting portions 212 are connected to form an I-shaped shape, which facilitates winding the support assembly 2 to form the coil 7. The coil 7 is arranged between the two supporting portions 212, so that the supporting portions 212 can limit the coil 7 from detaching from the main body 211, thereby preventing the coil 7 from moving relative to the support assembly 2 due to its own gravity when the support assembly 2 vibrates up and down.

Referring to FIGS. 3 to 6, in the first embodiment of the present application, the adhesive layer 22 is further arranged between the supporting portions 212 and the elastic members 6 and form fixing portions 221 between the supporting portions 212 and the elastic members 6. Therefore, the fixing portions 221 are formed by the adhesive layer. Specifically, the skeleton 21 only consists of the main body 211 and the supporting portions 212, and the adhesive layer 22 is completely covered on the outer side of the skeleton 21. Besides, each elastic member 6 is fixedly connected to each fixing portion 221, thereby saving a large amount of metal materials of the skeleton 21. Moreover, the surface of the skeleton 21 is not required to be subjected to surface treatment, thereby significantly saving costs. In an embodiment, each fixing portion 221 is provided with several positioning protrusions 223. Each elastic member 6 is provided with positioning through-holes matched with the positioning protrusions 223. The positioning protrusions 223 are embedded in the positioning through-holes of the elastic members 6, thereby achieving a quick positioning between the support assembly 2 and each elastic member 6, which is convenient to subsequently fix the adhesive layer 22 on the elastic members 6. The fixing manner between each fixing portion 221 and each elastic member 6 includes any one of riveting, screwing and heating. That is, the support assembly 2 may be fixedly connected to each elastic member 6 by riveting, screwing and heating.

Figure 3:
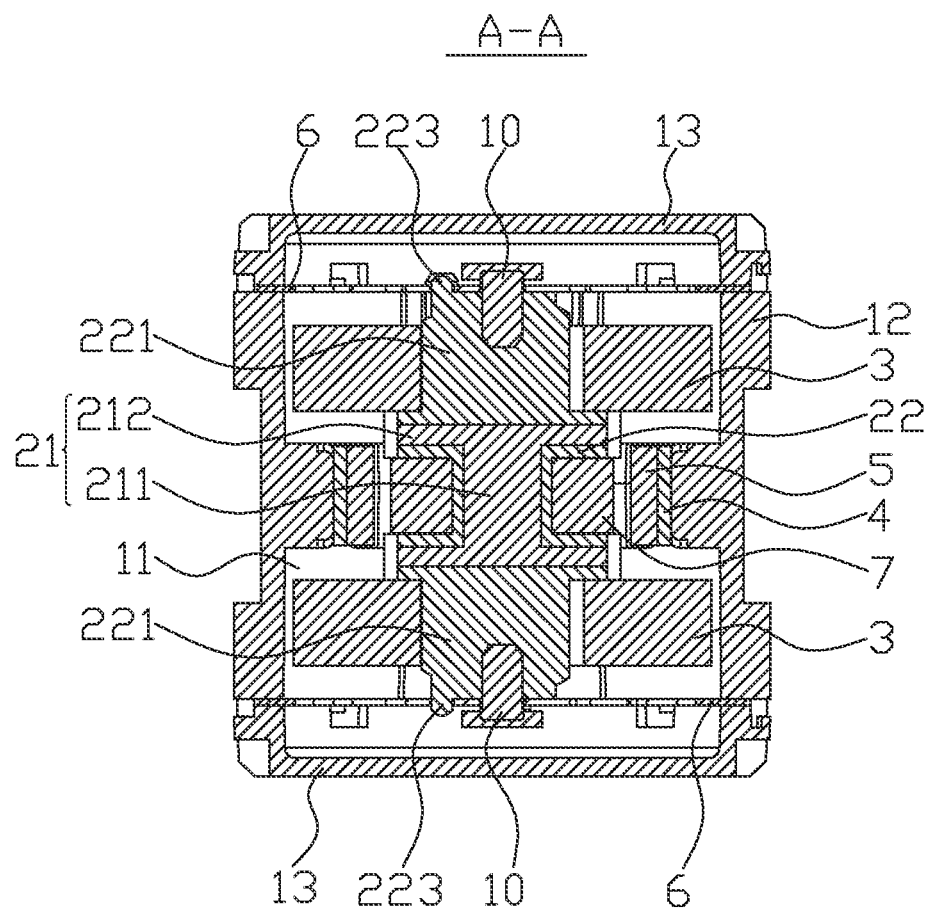
FIG. 3 is a cross-sectional view taken along a line A-A in FIG. 2, in which a skeleton consists of a main body and supporting portions, and an adhesive layer is fixed to an elastic member by riveting.
Figure 6:
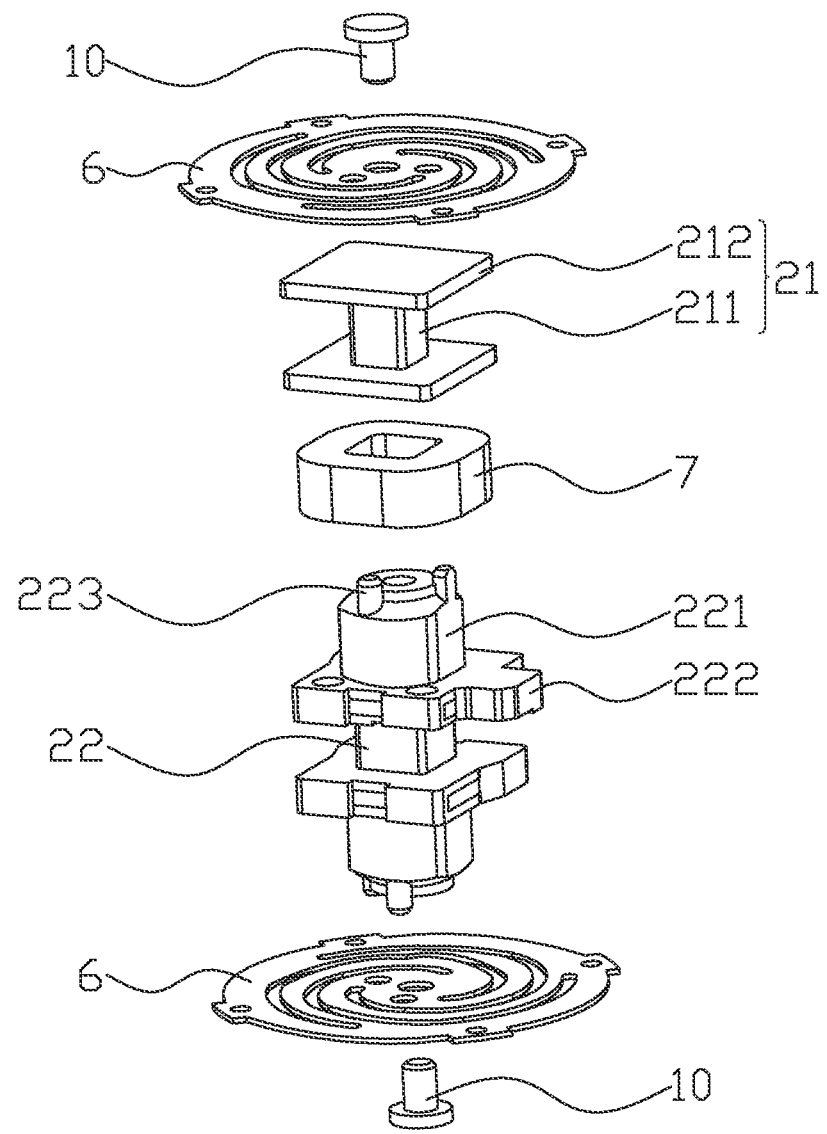
FIG. 6 is an exploded view of a vibrator assembly and elastic members according to a first embodiment of the present application.

Referring to FIGS. 3 and 6, each fixing portion 221 is provided with a first mounting hole, and the vibration motor further includes a first rivet 10 arranged through each elastic member 6 and fixed to the first mounting hole, so that the fixing portions 221 are fixed to the elastic members 6 by riveting. That is, the first rivets 10 may lock the adhesive layer 22 and the elastic members 6, thereby achieving the fixed connection between the support assembly 2 and the elastic members 6.

Figure 4:
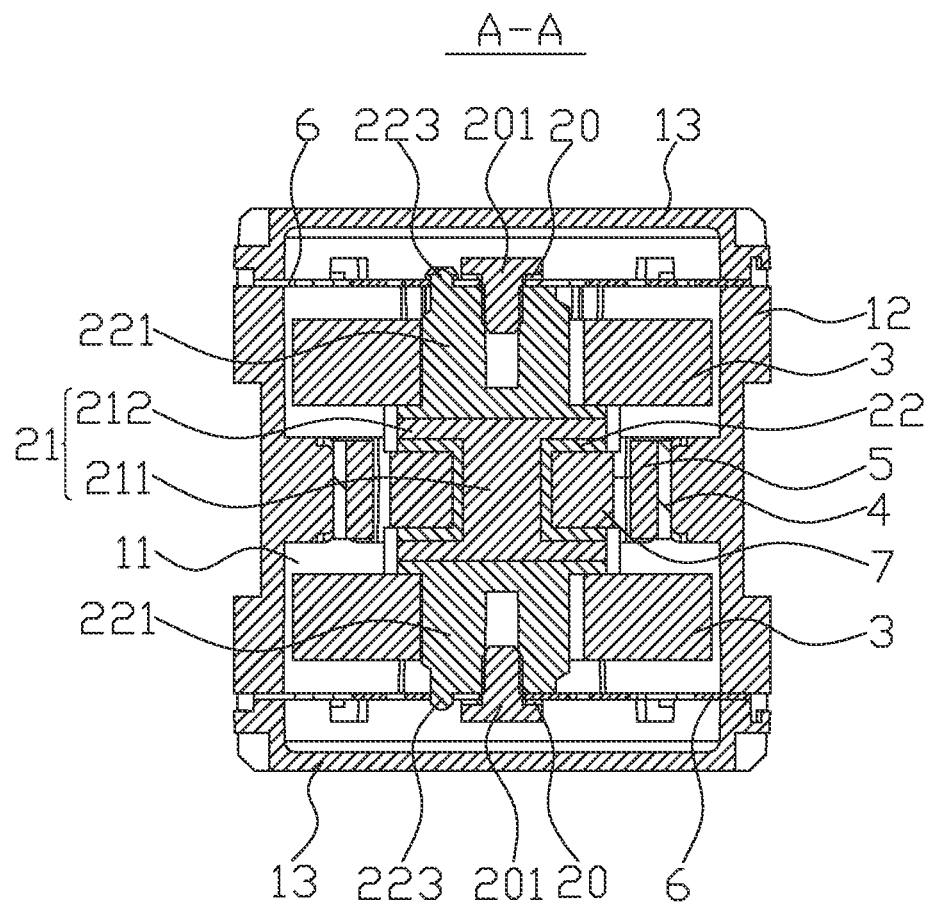
FIG. 4 is a cross-sectional view taken along the line A-A in FIG. 2, in which the skeleton consists of the main body and the supporting portions, and the adhesive layer is fixed to the elastic member by screwing.

Referring to FIG. 4, each fixing portion 221 is provided with a first threaded hole, and the vibration motor further includes a first screw 20 arranged through each elastic member 6 and connected to the first threaded hole, so that the fixing portions 221 are fixed to the elastic members 6 by screwing. That is, the first screw 20 may lock the adhesive layer 22 and the elastic members 6, thereby achieving a fixed connection between the support assembly 2 and the elastic members 6. Besides, in order to prevent each elastic member 6 from being damaged by the extrusion of the first screw 20, a first washer 201 may be provided between a nut of each first screw 20 and each elastic member 6.

Figure 5:
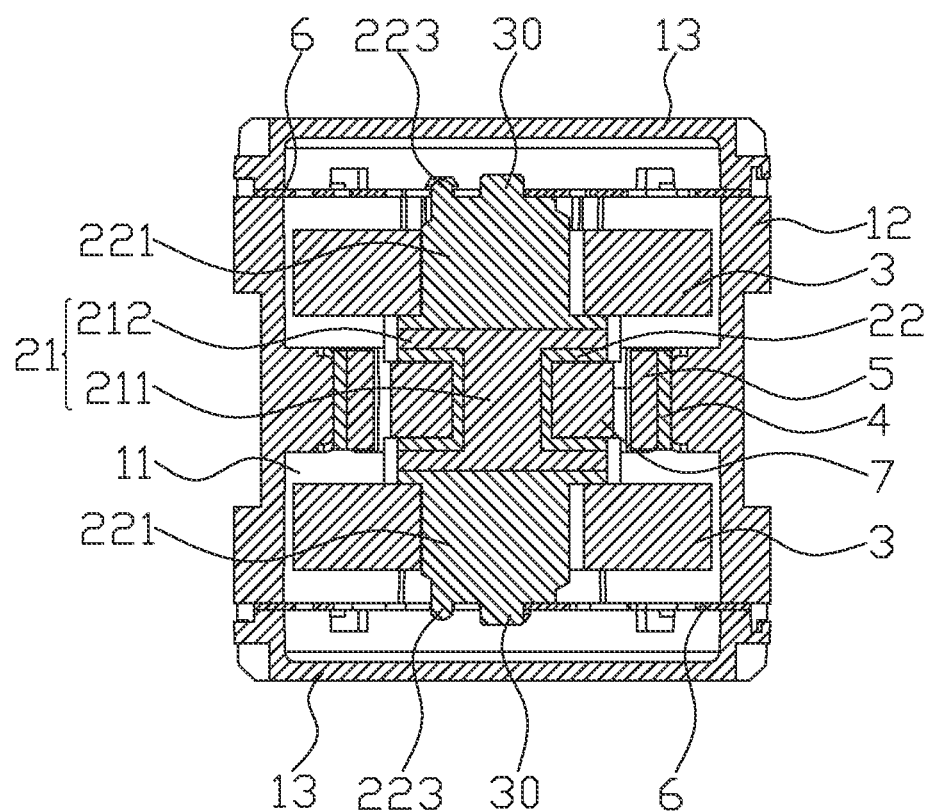
FIG. 5 is a cross-sectional view taken along the line A-A of FIG. 2, in which the skeleton consists of the main body and the supporting portions, and the adhesive layer is fixed to the elastic member by means of heating points.

Referring to FIG. 5, each elastic member 6 is provided with an avoidance hole, and the vibration motor further includes connecting protrusions 30. One end of each connecting protrusion 30 is fixed to each fixing portions 221 and the other end thereof is arranged through the avoidance hole. Each connecting protrusion 30 is fixedly connected to each elastic member by means of heating points, so that the fixing portions 221 are fixed to each elastic member 6 by means of heating points. Specifically, after the connecting protrusions 30 are arranged through the avoidance hole of each elastic member 6, an end of each connecting protrusion 30 far away from each fixing portion 221 is heated and melted to cover the edges of the avoidance hole of each elastic member 6, so that the adhesive layer 22 is fixedly connected to each elastic member 6, and the support assembly 2 is fixedly connected to each elastic member 6. According to practical needs, each fixing portion 221 is provided with several connecting projections 30, and each elastic member 6 is provided with several avoidance holes.

Referring to FIGS. 7 to 10, in a second embodiment of the present application, the skeleton 21 further includes connecting portions 213 extended from an end of the main body 211 along the vibration direction and protruded from the supporting portions 212. Each connecting portion 213 is fixedly connected to each elastic member 6. The adhesive layer 22 is further covered on peripheral sides of each connecting portion 213 and peripheral sides of the supporting portions 212. Specifically, the skeleton 21 consists of the main body 211, the supporting portions 212 and the connecting portions 213, and the main body 211 and the connecting portions 213 are integrally arranged, which facilitates the formation of the skeleton 21 and improves the strength of the skeleton 21. The fixed manner between each connecting portion 213 and each elastic member 6 includes any one of riveting, screwing and welding, that is, the support assembly 2 and the elastic members 6 may be fixedly connected by riveting, screwing and welding.

Figure 7:
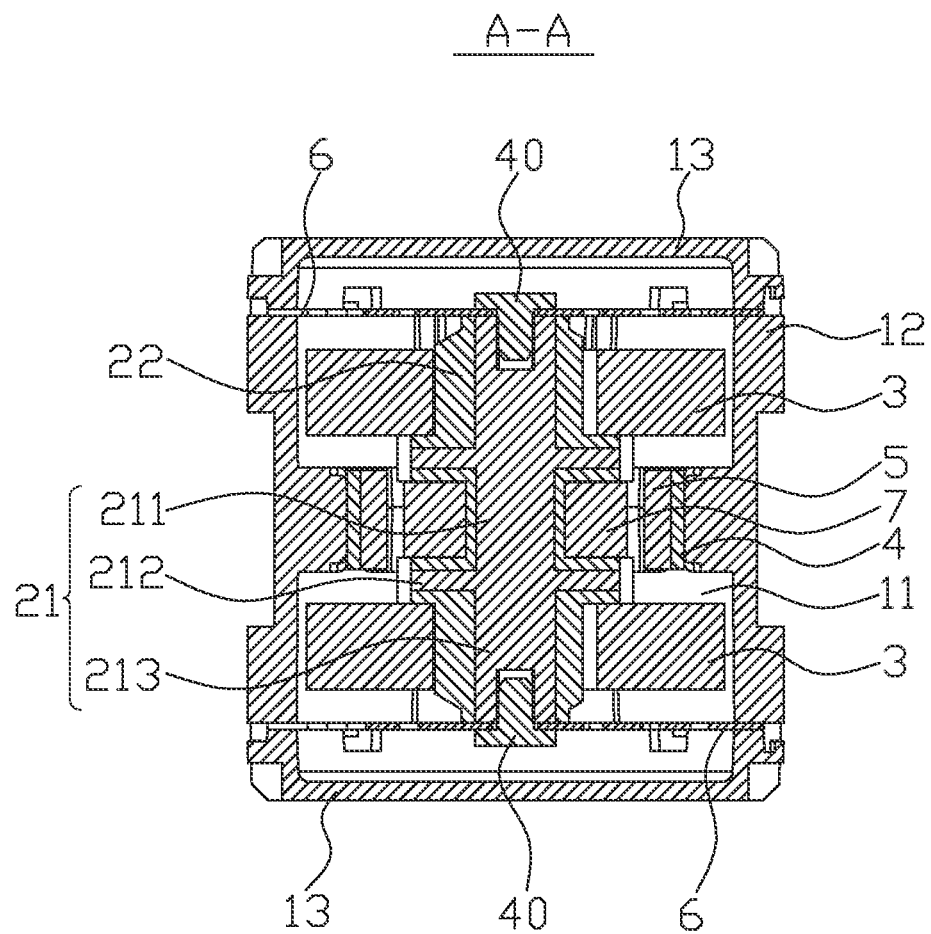
FIG. 7 is a cross-sectional view taken along the line A-A of FIG. 2, in which the skeleton consists of the main body, the supporting portions and connecting portions, and the connecting portions are fixed to the elastic members by riveting.

Referring to FIG. 7, each connecting portion 213 is provided with a second mounting holes, and the vibration motor further includes a second rivet 40 arranged through each elastic members 6 and fixed to each second mounting hole, so that each connecting portion 213 is fixed to each elastic members 6 by riveting. That is, the second rivets 40 can lock the adhesive layer 22 and the elastic members 6, thereby achieving a fixed connection between the support assembly 2 and the elastic members 6.

Figure 8:
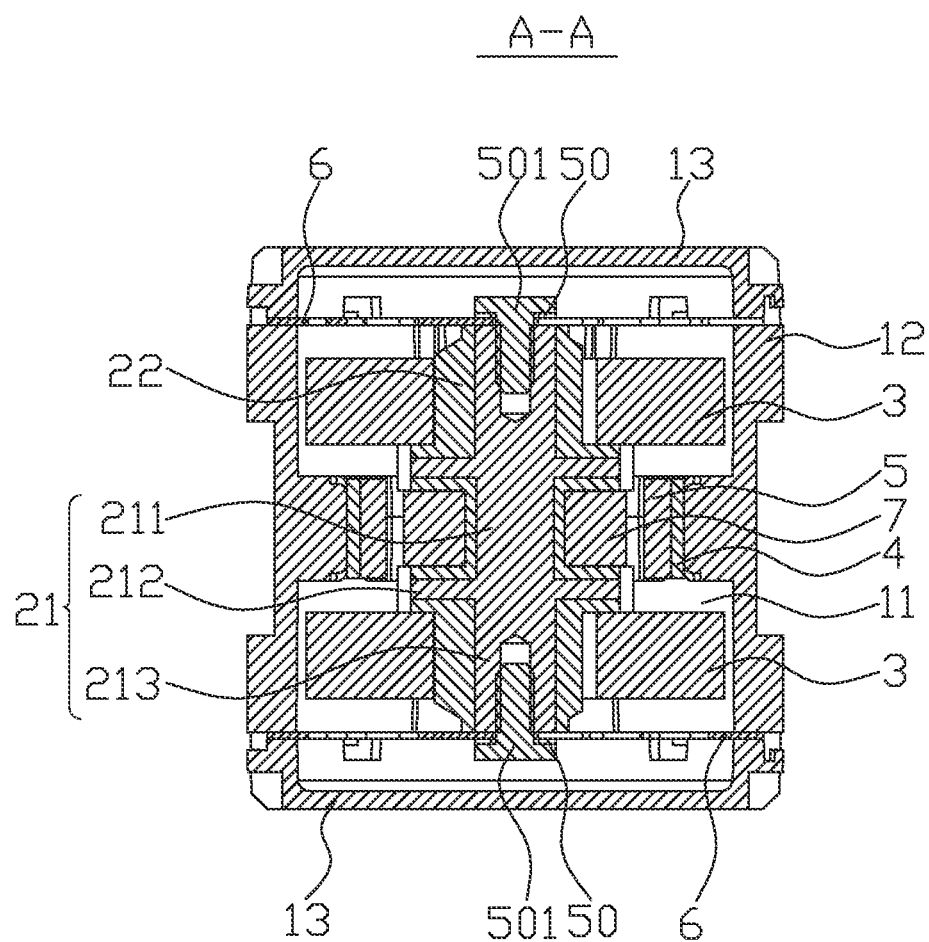
FIG. 8 is a cross-sectional view taken along the line A-A of FIG. 2, in which the skeleton consists of the main body, the supporting portions and the connecting portions, and the connecting portions are fixed to the elastic members by screwing.

Referring to FIG. 8, each connecting portion 213 is provided with a second threaded holes, and the vibration motor further includes a second screw 50 arranged through each elastic member 6 and connected to each second threaded hole, so that the connecting portions 213 is fixed the elastic members 6 by screwing. That is, the second screws 50 can lock the connecting portions 213 and the elastic members 6, thereby achieving a fixed connection between the support assembly 2 and the elastic members 6. Besides, in order to prevent the elastic members 6 from being damaged by the extrusion of the first screws 50, a second washer 501 may be provided between a nut of each second screw 50 and each elastic member 6.

Figure 9:
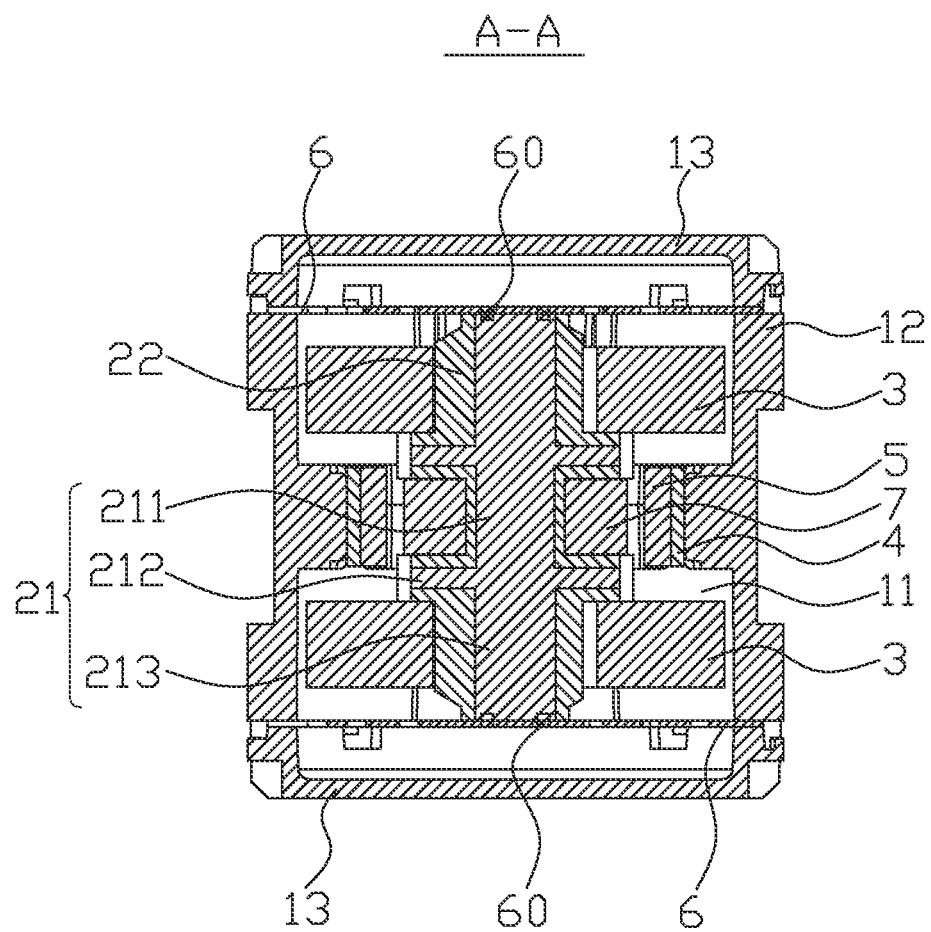
FIG. 9 is a cross-sectional view taken along the line A-A of FIG. 2, in which the skeleton consists of the main body, the supporting portions and the connecting portions, and the connecting portions are fixed to the elastic members by welding.
Figure 10:
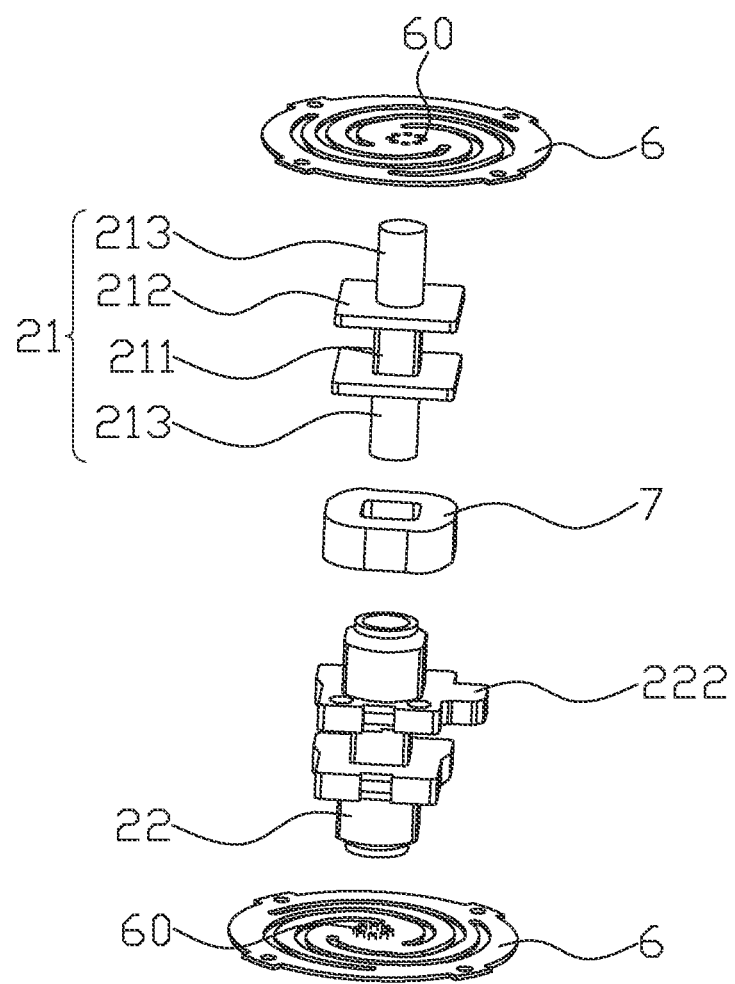
FIG. 10 is an exploded view of the vibrator assembly and the elastic members according to a second embodiment of the present application.

Referring to FIGS. 9 and 10, the vibration motor further includes a first welding spot 60 arranged on one side of each elastic member 6 away from each connecting portion 213. Each connecting portion 213 is fixedly welded to each elastic member 6 at each first welding spots 60. Specifically, after each connecting portion 213 is contacted with each elastic member 6, the welding is performed at the first welding spot 60 of each elastic member 6 to fix each connecting portion 213 and each elastic member 6 together, thereby achieving a fixed connection between the support assembly 2 and the elastic members 6.

Referring to FIGS. 11 to 14, in the third embodiment of the present application, the skeleton 21 further includes vertical posts 214. One end of each vertical post 214 is fixed to each supporting portion 212, and the other end thereof is fixed to each elastic member 6. The adhesive layer 22 is further covered on peripheral sides of the vertical posts 214 and outer sides of the supporting portions 212. Specifically, the skeleton 21 consists of the main body 211, the supporting portions 212, and the vertical posts 214. The vertical posts 214 and the main body 211 are the same in shape. The vertical posts 214 are made of a metal material, and the vertical post 214 and the supporting portions 212 are fixed together by welding. In an embodiment, each supporting portion 212 is provided with a positioning groove, and each vertical post 214 is provided with a positioning portion. Through the cooperation between the positioning portion and the positioning groove, the vertical posts 214 and the supporting portions 212 can be quickly positioned, thereby improving the assembly efficiency. According to practical needs, the positioning portions may be provided on the supporting portions 212, and the positioning grooves may be provided on the vertical posts 214. The vertical post 214 and the supporting portions 212 may also be fixed by means of adhering. The vertical posts 214 and the elastic members 6 are fixed by means of riveting, screwing, and welding. That is, the support assembly 2 may be fixedly connected to the elastic members 6 by means of riveting, screwing, and welding.

Figure 11:
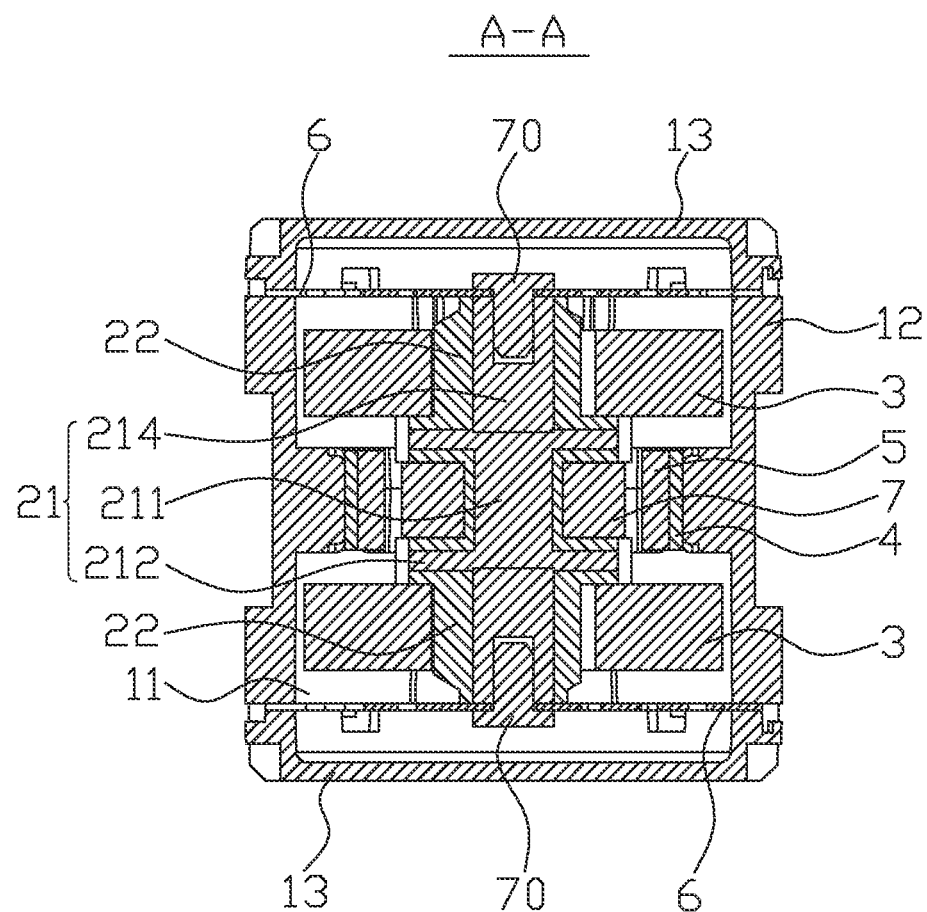
FIG. 11 is a cross-sectional view taken along the line A-A of FIG. 2, in which the skeleton consists of the main body, the supporting portions and vertical posts, and the vertical posts are fixed to the elastic members by riveting.

Referring to FIG. 11, each vertical post 214 is provided with a third mounting hole, and the vibration motor further includes a third rivet 70 arranged through each elastic member 6 and fixed to each third mounting hole, so that the vertical posts 214 are riveted and fixed to the elastic members 6. That is, the third rivets 70 may lock the adhesive layer 22 and the elastic members 6, thereby achieving a fixed connection between the support assembly 2 and the elastic members 6.

Figure 12:
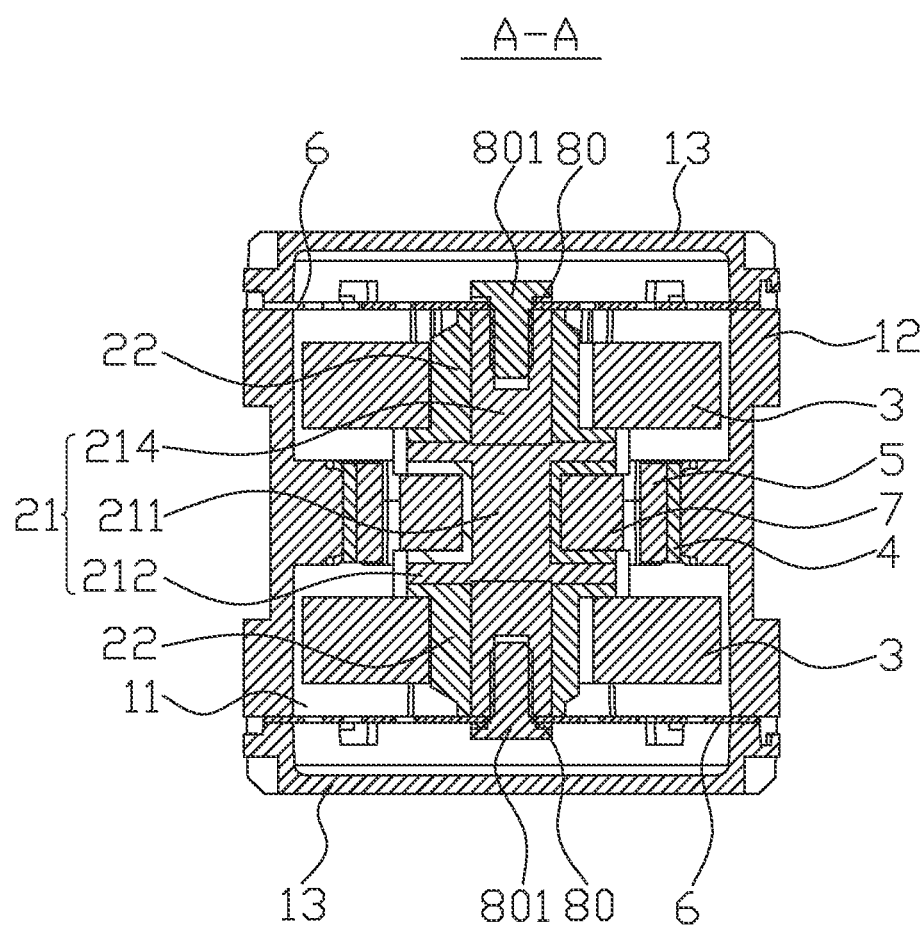
FIG. 12 is a cross-sectional view taken along the line A-A of FIG. 2, in which the skeleton consists of the main body, the supporting portions and the vertical posts, and the vertical posts are fixed to the elastic members by screwing.
Figure 14:
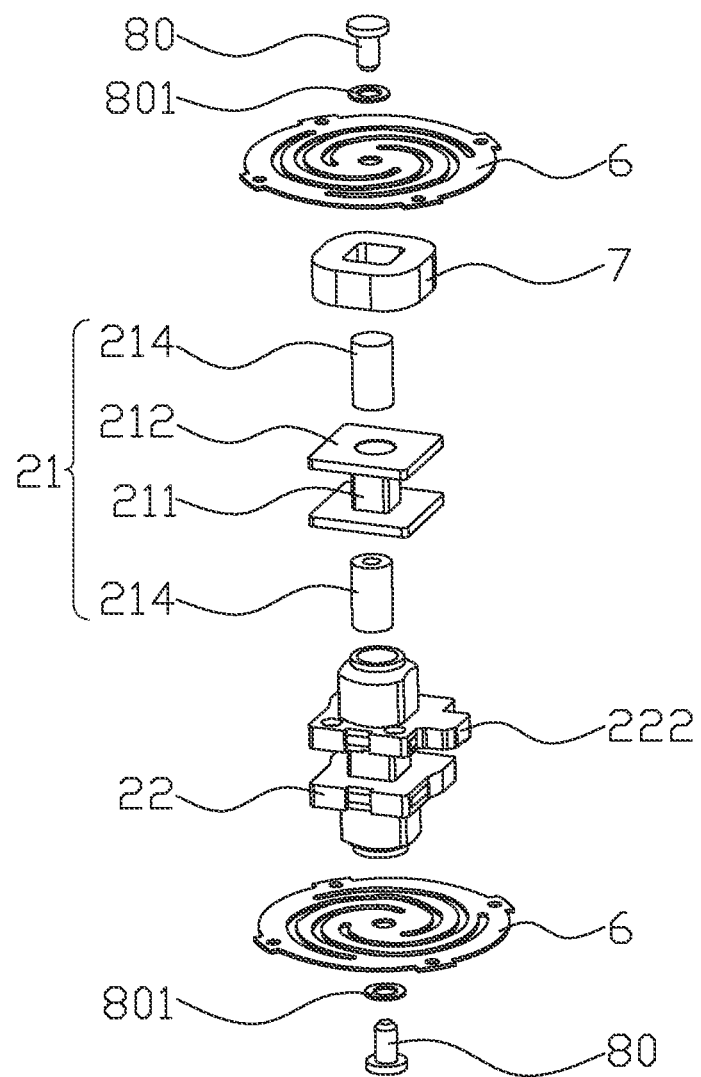
FIG. 14 is an exploded view of the vibrator assembly and the elastic members according to a third embodiment of the present application.

Referring to FIGS. 12 and 14, each vertical post 214 is provided with a third threaded hole, and the vibration motor further includes a third screw 80 arranged through each elastic member 6 and connected to each third threaded hole, so that each vertical post 214 is fixed to each elastic member 6 by screwing. That is, the third screws 80 can lock the vertical posts 214 and the elastic members 6, thereby achieving a fixed connection between the support assembly 2 and each elastic member 6. In order to prevent each elastic member 6 from being damaged by the extrusion of the third screw 80, a third washer 801 may be provided between a nut of each third screw 80 and each elastic member 6.

Figure 13:
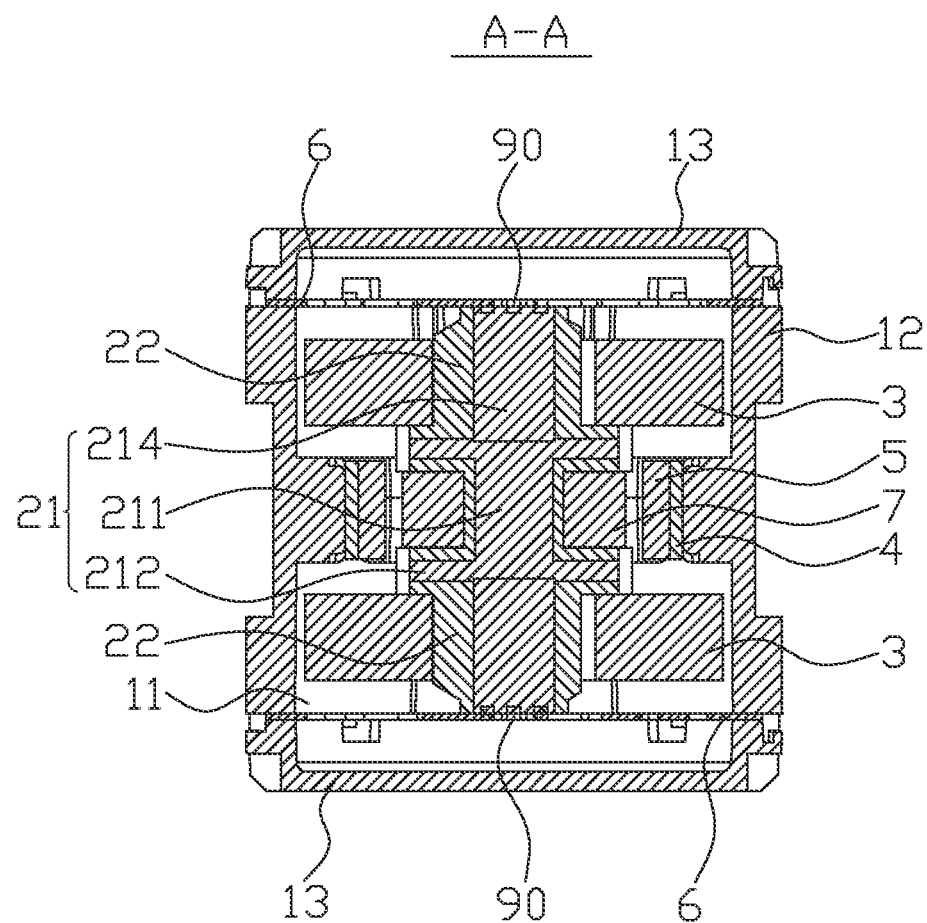
FIG. 13 is a cross-sectional view taken along the line A-A of FIG. 2, in which the skeleton consists of the main body, the supporting portions and the vertical posts, and the vertical posts are fixed to the elastic members by welding.

Referring to FIG. 13, the vibration motor further includes a second welding spot 90 arranged on one side of each elastic member 6 away from each vertical post 214. Each vertical post 214 is fixedly welded to each elastic member 6 at the second welding spot 90. Specifically, after each vertical post 214 is contacted with each elastic member 6, the welding is performed at each second welding point 90 of each elastic member 6 to fix each vertical post 214 and each elastic member 6 together, thereby achieving a fixed connection between the support assembly 2 and each elastic member 6.

Referring to FIG. 1, in an embodiment, the casing 1 includes an outer casing 12 with a through-cavity, and two cover plates 13 covered and assembled on two ends of the outer casing 12 to form the accommodating space 11. Each elastic member 6 is fixed to the outer casing 12 by mean of heating, and two ends of each elastic member 6 are abutted against the outer casing 12 and each cover plate 13, respectively. Specifically, each elastic member 6 may be formed by arranging a plurality of through-grooves on an elastic piece. The edges of each elastic member 6 are fixed to the outer casing 12, and the support assembly 2 is fixedly connected to a middle area of each elastic member 6, so that the elastic members 6 can provide a restoring force for restoring the vibrator assembly and enables the vibrator assembly to vibrate up and down relative to the casing 1. The edges of each elastic member 6 is provided with a plurality of through-holes, and an end of the outer casing 12 is provided with a plurality of protrusions, so that the protrusions of the outer casing 12 are extended into the through-holes of each elastic member 6 to fix the heating points between each elastic member 6 and the outer casing 12. It should be understood that, since two sides of each elastic member 6 are respectively abutted against the outer casing 12 and each cover plate 13, after each elastic member 6 and the outer casing 12 are primarily fixed by means of heating, each elastic member 6 may also be pressed against the outer casing 12 by each cover plate 13.

Referring to FIGS. 1 to 14, in one embodiment, the adhesive layer 22 is extended towards an inner wall of the casing 1 to form a contact portion 222. The vibration motor further includes a flexible printed circuit 8, one end of which is fixed to the side wall of the casing 1, and the other end of which is fixed to the contact portion 222. The flexible printed circuit 8 is electrically connected to the coil 7. Specifically, the adhesive layer 22 covered on the outer side of the supporting portions 212 is extended towards the inner wall of the casing 1 to form the contact portion 222, and there is a gap between the contact portion 222 and the inner wall of the casing 1. The flexible printed circuit 8 is fixed on one side of the contact portion 222 close to the coil 7, so as to facilitate the connection between the coil 7 and the flexible printed circuit 8. It should be understood that since the flexible printed circuit 8 is fixed on the adhesive layer 22 and the flexible printed circuit 8 is flexible, an end of the flexible printed circuit 8 connected to the adhesive layer 22 can follow the vibration of the support assembly 2, so as to prevent the connection between the coil 7 and the circuit board from being broken due to relative movement. The vibrator assembly further includes two mass blocks 3 nested and fixed on the outer side of the adhesive layer 22 and spaced from the coil 7, and a gap is provided between each mass block 3 and the inner wall of the casing 1. Specifically, each mass block 3 is arranged on a side of each supporting portions 212 away from the coil 7, so that the mass blocks 3 are supported and fixed by the supporting portions 212. The mass blocks 3 can follow the vibration of the support assembly 2 to provide a vibration amount, thereby improving the vibration effect of the vibrator assembly. The stator assembly includes a polar core 4 fixed on the casing 1 and a magnetic steel 5 fixed on one side of the polar core 4 close to the support assembly 2. The magnetic steel 5 is located between the two mass blocks 3, and the magnetic steel 5 is configured to provide a magnetic field. Specifically, two stator assemblies are provided in the casing 1, and the two stator assemblies are arranged at two sides of the coil 7. The two stator assemblies are arranged opposite to each other, that is, two magnetic steels 5 are arranged at two sides of the coil 7 and opposite to each other, so as to ensure that the magnetic steels 5 can provide the magnetic field for cutting the coil 7. It should be understood that the vibrator assembly is arranged in a middle area of the casing 1, and the stator assemblies are distributed on two sides of the vibrator assembly, so that members of the vibration motor are arranged closely, thus having a space utilization.

Described above are only embodiments of the present application. It should be noted that, for those skilled in the art, improvements made without departing from the concept of the present application shall fall within the protection scope of the present application.

What is claimed is:

1. A vibration motor, comprising;
a casing with an accommodating space;
elastic members;
a vibrator assembly movably connected to the casing via the elastic member, comprising:
a support assembly, two ends of the support assembly being fixedly connected to a corresponding elastic member, comprising:
a skeleton; and
an adhesive layer at least partially covered on an outer side of the skeleton; and
a coil nested outside the adhesive layer; and
a stator assembly fixed to the casing and configured to provide a driving force for the vibrator assembly to move along a vibration direction;
wherein the vibrator assembly, the stator assembly, and the elastic member are accommodated in the accommodating space; wherein the adhesive layer is extended towards an inner wall of the casing to form a contact portion; the vibration motor further comprises a flexible printed circuit, wherein one end of the flexible printed circuit is fixed to a side wall of the shell, and the other end of the flexible printed circuit is fixed to the contact portion; and the flexible printed circuit is electrically connected to the coil;
the vibrator assembly further comprises two mass blocks nested and fixed on an outer side of the adhesive layer and spaced apart from the coil, and a gap is provided between each of the mass blocks and an inner wall of the casing;
the stator assembly comprises a polar core fixed to the casing and a magnetic steel fixed at one side of the polar core close to the support assembly; the magnetic steel is located between the two mass blocks, and the magnetic steel is configured to provide a magnetic field.

2. The vibration motor of claim 1, wherein the skeleton comprises:
a main body; and
two supporting portions fixed at two ends of the main body;
wherein the supporting portions are protruded from a surface of a peripheral side of the main body; the adhesive layer is covered on a peripheral side of the main body, and the coil is arranged between the two supporting portions.

3. The vibration motor of claim 2, wherein the adhesive layer is further arranged between the supporting portions and the elastic members and form fixing portions between the supporting portions and the elastic members.

4. The vibration motor of claim 3, wherein each of the fixing portions is provided with a first mounting hole, and the vibration motor further comprises a first rivet arranged through each of the elastic members and fixed to each of the first mounting holes; and/or,
each of the fixing portions is provided with a first threaded hole, and the vibration motor further comprises a first screw arranged through each of the elastic members and connected to each of the first threaded holes; and/or,
each of the elastic members is provided with a positioning hole, and the vibration motor further comprises connecting protrusions, wherein one end of each of the connecting protrusion is fixed to the fixing portion, and the other end of each of the connecting protrusion arranged through the positioning hole; the connecting protrusions are fixedly connected to the elastic members by means of heating points.

5. The vibration motor of claim 3, wherein each of the fixing portions is provided with a first mounting hole, and the vibration motor further comprises a first rivet arranged through each of the elastic members and fixed to each of the first mounting holes.

6. The vibration motor of claim 3, wherein each of the fixing portions is provided with a first threaded hole, and the vibration motor further comprises a first screw arranged through each of the elastic members and connected to each of the first threaded holes.

7. The vibration motor of claim 2, wherein the skeleton further comprises connecting portions extended from an end of the main body along the vibration direction and protruded from the supporting portions; the connecting portions are fixedly connected to the elastic members, and the adhesive layer is further covered on a peripheral side of each of the connecting portion and an outer side of each of the supporting portions.

8. The vibration motor of claim 7, wherein each of the connecting portions is provided with a second mounting hole, and the vibration motor further comprises a second rivet arranged through each of the elastic members and fixed to each of the second mounting holes; and/or,
each of the connecting portions is provided with a second threaded hole, and the vibration motor further comprises a second screw arranged through each of the elastic members and connected to the each of the second threaded holes; and/or,
the vibrating motor further includes a first welding spot arranged on a side of each of the elastic members away from the connecting portions, and the connecting portions are fixedly welded to the elastic member at the first welding spot.

9. The vibration motor of claim 2, wherein the skeleton further comprises vertical posts, wherein one end of each of the vertical posts is fixed to each of the supporting portions, and the other end of each of the vertical posts is fixed to each of the elastic members; and the adhesive layer is further covered on peripheral sides of the vertical posts and outer side of the supporting portions.

10. The vibration motor of claim 9, wherein each of the vertical posts is provided with a third mounting hole, and the vibration motor further comprises a third rivet arranged through each of the elastic members and fixed to each of the third mounting hole; and/or,
each of the vertical posts is provided with a third threaded hole, and the vibration motor further comprises a third screw arranged through each of the elastic members and connected to each of the third threaded holes; and/or, the vibrating motor further comprises a second welding spot arranged on a side of each of the elastic members away from the vertical posts, and the vertical posts are fixedly welded to the elastic member at the second welding spot.

11. The vibration motor of claim 9, wherein the vertical posts are fixed to the supporting portions by welding or adhering; each of the supporting portions is provided with a positioning groove; each of the vertical posts is provided with a positioning portion, and the positioning portions are embedded and fixed in the positioning grooves.

12. The vibration motor of claim 1, wherein the casing comprises:

an outer casing with a through-cavity; and two cover plates assembled on two ends of the outer casing to form the accommodating space;

wherein the elastic members are fixed with the casing by means of heating, and two ends of each of the elastic members are abutted against the outer casing and each of the cover plates, respectively.

\* \* \* \* \*